United States Patent
Billiard et al.

(10) Patent No.: US 8,261,194 B2
(45) Date of Patent: Sep. 4, 2012

(54) METHOD AND DEVICE FOR GRAPHICAL INTERFACING

(75) Inventors: Jean Francois Billiard, Nice (FR); Bertrand Laporte, Nice (FR); Pascale Caron, Nice (FR); Jérôme Petit, Nice (FR); Richard Molenaar, Nice (FR)

(73) Assignee: Amadeus s.a.s., Biot (FR)

( * ) Notice: Subject to any disclaimer, the term of this patent is extended or adjusted under 35 U.S.C. 154(b) by 1433 days.

(21) Appl. No.: 10/562,821

(22) PCT Filed: Jun. 28, 2004

(86) PCT No.: PCT/EP2004/051276
§ 371 (c)(1),
(2), (4) Date: Dec. 29, 2005

(87) PCT Pub. No.: WO2005/003966
PCT Pub. Date: Jan. 13, 2005

(65) Prior Publication Data
US 2006/0168249 A1    Jul. 27, 2006

Related U.S. Application Data

(60) Provisional application No. 60/486,174, filed on Jul. 11, 2003.

(51) Int. Cl.
*G06F 3/00* (2006.01)
*G06F 15/16* (2006.01)
(52) U.S. Cl. .................. 715/744; 715/745; 709/203
(58) Field of Classification Search .............. 715/760, 715/234–242, 744–748; 709/228, 203, 235
See application file for complete search history.

(56) References Cited

U.S. PATENT DOCUMENTS
5,119,475 A * 6/1992 Smith et al. ................... 715/866
(Continued)

FOREIGN PATENT DOCUMENTS
WO    WO 02/44897    * 6/2002

OTHER PUBLICATIONS

A. Ceponkus, F. Hoodbhoy: "Applied XML: A Toolkit for Programmers" 1999, John Wiley & Sons, Inc., XP002275167 p. 33, alinea 4—p. 37, alinea 3 p. 46, alinea 5—p. 48, alinea 1; figure 2.12 p. 334, ligne 1—p. 336, derniere ligne ; figures 11.1, 11.2 p. 339, ligne 1—p. 346, derniere ligne ; figures 11.3-11.5.

(Continued)

*Primary Examiner* — Robert Stevens
*Assistant Examiner* — Andrew Tank
(74) *Attorney, Agent, or Firm* — Young & Thompson

(57) ABSTRACT

A method and device for graphical interfacing between a user and an information system. The method includes introducing a user request in a client station, transmitting the request to a server, processing the request and generating an answer and transmitting the answer to the client station. The generated answer includes instruction data and displayable data, instruction data determining a useable visualization model is interpreted in the client station, the visualization model is formed in the client station by associating locally available construction elements and the displayable data together with the visualization model are merged in order to display a merging result. The method is used for producing a graphical user interface.

16 Claims, 4 Drawing Sheets

U.S. PATENT DOCUMENTS

| | | | | |
|---|---|---|---|---|
| 5,327,529 | A | * | 7/1994 | Fults et al. .................... 715/762 |
| 5,448,740 | A | * | 9/1995 | Kiri et al. ...................... 717/155 |
| 6,320,602 | B1 | * | 11/2001 | Burkardt et al. ............. 715/817 |
| 6,963,930 | B2 | * | 11/2005 | Halpert et al. ............... 709/246 |
| 7,013,340 | B1 | * | 3/2006 | Burd et al. ................... 709/229 |
| 2002/0085020 | A1 | | 7/2002 | Carroll, Jr. ................... 715/700 |
| 2002/0116455 | A1 | | 8/2002 | Mitchell et al. .............. 709/203 |
| 2002/0130900 | A1 | * | 9/2002 | Davis ........................... 345/744 |

OTHER PUBLICATIONS

Betz K et al: "Developing highly-responsive user interfaces with DHTML and servlets" Performance, Computing, and Communications Conference, 2000. IPCCC '00. Conference Proceeding of the IEEE International Phoenix, AZ, USA Feb. 20-22, 2000, Piscataway, NJ USA, IEEE, US Feb. 20, 2000, pp. 437-443, XP010500055 ISBN: 0-7803-5979-8 abrege p. 437, colonne 1, ligne 1—p. 442, colonne 2, derniere ligne.

\* cited by examiner

METHOD AND DEVICE FOR GRAPHICAL INTERFACING

FIELD OF THE INVENTION

The present invention relates to a method and a device for a graphic user interface with a computer system.

It more specifically applies to carry out graphical user interfaces notably in the field of computerized reservation systems.

DESCRIPTION OF THE RELATED ART

User interfaces have, in general, much evolved with the adoption and dramatic spread of wide area networks and, particularly, the Internet.

Within the framework of Internet, graphical interface solutions have allowed important savings as far as products development is concerned.

However, for sophisticated applications such as business applications that deal with computerized reservation systems, user interfaces based on these techniques require to have to transfer large bulky pages formatted according to a markup language such as HTML (Hyper Text Mark-up Language).

Drawbacks are related to this type of transmission in which only integral pages, built in the server part, are transmitted to the navigator of the client terminal. This poses several problems. In particular, the client part of the user interface exhibits significant structural limitations due to the HTML language. Moreover, taking into account the size of the transfers to be performed between the server and the client terminal, the occupation of the transmission network is high, which implies a higher response time for the clients equipped with a low-speed connection.

This way of building HTML pages appears in document US-A-2002116455.

According to slightly different techniques, "style sheets" are locally stored to be re-used and merged with dynamic files. However, these style sheets are predetermined and their characteristics set once for all. They do not offer any flexibility while they are used. For example, if one has to create a page with a style sheet that hardly differ from a style sheet present in the local cache the local sheet is not however useable and it is necessary to obtain a new complete style sheet from the server.

There is a need regarding user interfaces possessing the properties of richness, flexibility and performance as processed in the server part while ensuring a reduction of the network occupation when provided for display to the client.

SUMMARY OF THE INVENTION

The present invention falls within the scope of this tradeoff and allows reducing, on the one hand, the computing time on the server and, on the other hand, the traffic on the network between the server and the client, which makes it possible to decrease the total response time of the application. Moreover, the device of the invention maintains a great deal of flexibility because the server part keeps controlling the processing of data to be displayed. The device also makes it possible to modify and create for the user the graphic visualization models to be displayed along with the delivery of instructions regarding the client terminal display.

More precisely, the invention has the advantage of providing to the display means information merged from two data sources. Indeed, on the one hand, the device of the invention generates static objects, held locally at the level of the client terminal and allowing a local availability of multiple graphic objects used for display.

On the other hand, the dynamic data corresponding to the client request are generated after processing in the server part and are transmitted to the client terminal. Merging of the dynamic and static data is then performed to produce visualization especially, under the form of formatted HTML pages through the use of a navigator.

By implementing specific equipment to the level of the client terminal, one can generate locally the model of visualization to be used for display. That is obtained from the association of various model construction elements which will be further detailed in the description.

It follows that the construction data of the visualization models are not forwarded any more through the network. Moreover, the system is easily personalized according to the local requirements of the client terminal (specific graphic objects, particular logical rules to apply, particular local data to use . . . ).

This potential personalization of the client terminal does not affect its original components and in particular the navigator: one can indeed generate a formatted HTML page with the navigator. It will be also noted that the visualization models being created from low size objects, updating them requires only few network resources.

The volume of data to be transmitted is thus reduced significantly between the server part and the client terminal. Therefore, one takes advantage of the richness of standard markup languages, such as HTML, while decreasing considerably the response time and the network requirements.

Other objects and advantages will become apparent in the description which follows of a preferred embodiment of the invention which is however not restrictive.

The present invention relates to a method for a graphic user interface with a computer system in which following operations are performed:

User inputs a request from a client terminal,
Request is transmitted to a server part for the purpose of being processed and to generate a response,
Client terminal receives the response,
Result of response is displayed for the user,
According to the invention:
The client terminal receives a response which is comprised of instruction data and of data to be displayed;
At the level of the client terminal, instruction data are executed in order to construct a visualization model to be used
At the level of the client terminal, the above visualization model is created through the association of construction elements locally available;
Data to be displayed are merged with the visualization model in order to display merging result.
According to advantageous but nonrestrictive possibilities:
The construction elements include a descriptive interface of the visualization model objects, a presentation layer and some logical rules to be applied locally to the visualization model;
At the level of the client terminal, among the language resources locally available, one is associated to the created visualization model;
At the level of the client terminal, one may associate to the visualization model some personalization display filters in order to modify the visual rendering of the default visualization model;

The instruction data include the indication of the type and characteristics of the construction elements for the visualization model to be created;

Locally available data are updated at the level of the client terminal through the following steps:

At the level of the server, a storing message is generated which includes storing instruction data and data to be stored, Storing message is transmitted to the client terminal, At the level of the client terminal, instruction data are interpreted in order to perform the storing and the message data to be stored are stored in a local memory, Display is performed at the level of the client terminal through the use of a navigator, Some of the data to be displayed and some construction elements of the visualization model use a XML format;

Merging result is translated to the HTML format in order to be displayed,

Response from server part is comprised of instruction data and data to be displayed.

The invention also relates to a graphical interface device between a user and a computer system comprising:

Means for inputting a user request at the level of the client terminal,

Means for communicating between the client terminal and a server part,

Processing means for generating a response from the server part,

Means for displaying the result of the response at the level of the client terminal.

It includes, at the level of the client terminal, an instructions manager capable of interpreting instruction data for the construction of a visualization model framework;

It includes, at the level of the client terminal, an association engine capable of creating the above visualization model from the association of construction elements;

It includes, at the level of the client terminal, storing means for the construction elements;

It includes, at the level of the client terminal, means for merging the visualization model with the data to be displayed in order to display the merging result.

In a preferred embodiment:

The construction elements include a descriptive interface of the visualization model objects, a presentation layer and some logical rules to be applied locally to the visualization model;

It includes a rule engine capable of applying the logical rules of the visualization model;

It includes a navigator to display the merging result at the level of the client terminal.

The accompanying drawings illustrate, by way of examples, the invention and are not meant to limit its scope. They represent only one embodiment of the invention in order to easily understand it.

BREIF DESCRIPTION OF THE DRAWINGS

FIG. 1 is a schematic representation of the process that presently takes place between a client and a server when a user issues a request, using a navigator such as Internet Explorer®, in an architecture based on the Internet system.

FIG. 2 schematically shows the process of a user request when invention is carried out.

DETAILED DESCRIPTION OF THE PREFERRED EMBODIMENTS

Figure 1:
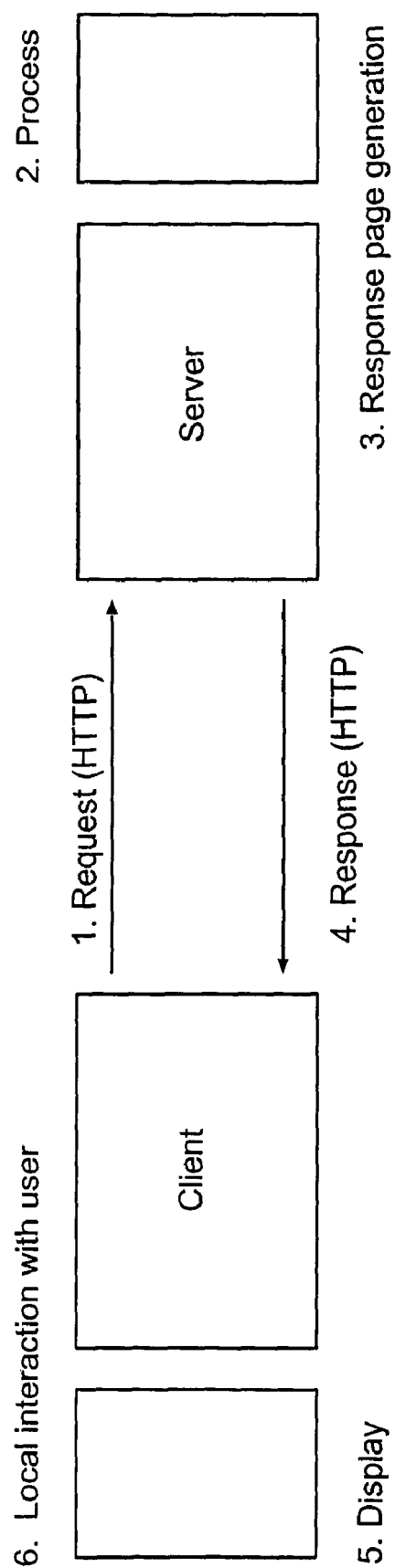

FIG. 1 describes a standard scenario while using the world network usually referred to as the "World Wide Web". In this case, the user requests at the level of client part consist in requesting HTML (Hyper Text Mark-up Language) formatted pages with the following instructions: http get or http post.

A first limitation of this mechanism is that user must specify the window in which display will occur and this, before sending the request. The server is thus not free to decide to display the response in a dialog window or in the main window since this has been defined at the client level.

Another drawback that can be raised is that only one window can be refreshed at a time. For example, if the main window had been divided in two sub-windows user needs to forward two successive requests to the server to get the two sub-windows successively refreshed. Also, the display modifications can only occur through a complete refreshing of an integral screen part even though it is possible that the user request consists in a simple updating of certain displayed data. According to the present device it is however necessary to refresh the whole screen for any type of requested modifications.

There is no means of efficiently storing information at the level of the client terminal unless to use "cookies" which are however of small size and require a transit through the network with each request.

Once user has entered his/her request it is transmitted through the Internet network using communication protocols like HTTP (Hyper Text Transfer Protocol). This step is shown in FIG. 1 at reference mark 1. The process of the request is performed at the level of the server and shown at reference mark 2. A response is then generated as shown at reference mark 3, here under the form of a HTML formatted page, which implies to combine in a same response the data elements and the presentation elements of what is to be displayed for the user. Hence, each time one wishes to access a page it is necessary to download, from the server part, the totality of the HTML page including the data to be displayed (variable data and formatting 'static' data e.g.: help texts, colors, fonts. Thus, the traffic generated on the network to transmit pages is large.

Reference mark 4 in FIG. 1 shows that response, which takes the form of a HTML page, is forwarded to the client. It is worth noting that, for business applications, data must be encrypted which implies a process time all the more significant as the size of data to be encrypted is high.

At the level of the client terminal, display of the response is made available to the user as shown at reference mark 5 in FIG. 1. Display is carried out through the use of a navigator such as the one known under the brand name of Internet Explorer®.

Some operations may be carried out locally to prevent from having to systematically access the server. Thus, some applications e.g., those edited in JavaScript can be implemented to get certain tools. Another drawback of the present devices is therefore that it becomes necessary to have recourse to additional tools to be programmed in JavaScript language at the level of the client terminal.

Figure 2:
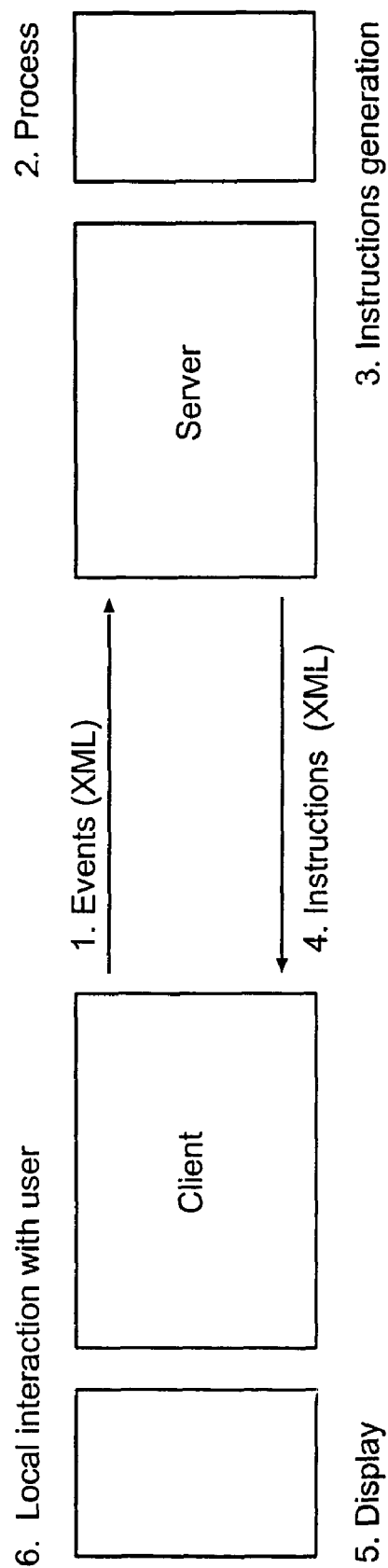

On the contrary, FIG. 2 shows an exemplary scenario of a graphical interface device operating according to the invention.

As previously pointed out, the current architecture used for the Internet network (World Wide Web) raises problems dealing with the fact that the integrality of HTML pages are downloaded to the client terminal.

As shown in FIG. 2 this is not the case of the present invention.

More specifically, as user request destined for the server part is inputted, a XML (Extensible Mark-up Language) or other structured formatted message is issued that include information entered by the user. As client request thus generated represents the user action it has been named 'event' in FIG. 2 at reference mark 1.

After transmission this 'event' request is received and processed at the level of the server part. The first processing phase consists in analyzing the request content, which is done by a user interface layer in the server and will be more detailed here after. Then, one proceeds to the process of the 'event' request data in an application layer that will be also further discussed here after.

These processing phases are shown in FIG. 2 at reference mark 2 'process'. Once request has been processed the server part generates the appropriate response towards the client. In this case, instead of building a complete formatted HTML page, according to the invention, a series of instructions is rather generated to be interpreted by the client. As far as the client terminal behavior is concerned this gives it a great deal of flexibility. For example, a single message may allow to perform refresh operations of a screen part, to open a dialog box, to display message etc. and this, in a simultaneous way.

Once created message is forwarded under the form of a XML (Extensible Mark-up Language) document to the client terminal, possibly after having been compressed and encrypted. This operation is depicted at reference mark 4 where it is designated by the term 'instructions' which corresponds to the functionality described in previous chapter.

This instructions message is received at the level of the client terminal and must be interpreted.

Especially, the dynamic data included in the server response are extracted and could be merged with a visualization model which corresponds to the static objects necessary for the display. Each visualization model is moreover created at the level of the client terminal through the association of construction elements. These are the instruction data which determine what construction elements have to be associated. The combination through a merge of two data types (presentation layer and dynamic data issued from the server) makes possible the creation of complete data to de displayed; especially, under the form of a HTML formatted page. It is then possible to use for the visualization the functionalities of known standard navigation means such as the navigator distributed under the brand name of Internet Explorer®.

Multiple advantages result from the merge operation thus carried out in the client part. First, once visualization models and their depending elements (images, scripts, etc. . . . to which models make reference) have been obtained, and are available at the level of the client terminal, only dynamic elements have to be forwarded through the communication network. The requirements on the network are thus much lowered.

The update of the static data is moreover very sparing in transmission resources because the concerned elements are of small sizes. For example, if a graphical object must be changed it is not necessary to download the whole visualization model that uses it.

Moreover, only the data transmission channel needs to be secured in the communication means which allows limiting the capacity of the required encrypting means when secure communications have to be considered.

Once the merge has been performed its result can be displayed at the level of the client terminal such as shown at step 5 of FIG. 2.

A local interaction with the user is then possible as shown at step 6 and implements a rule engine able to apply logical rules associated to the visualization model used and available locally as this is further explained here after. It may include different modes of operation.

Especially, if the instructions transmitted by the server correspond to some controls (such as a box to display a drop-down list) the events to operate it can be managed by a JavaScript formatted code associated to the control considered.

If the operational events comprise interactions between different controls (for example, if field A was filled in then, field B becomes mandatory) this can be achieved of different manners.

Thus, if the interaction is complex, but seldom used, it can be managed at the level of the server and asked under the form of a request issued by the client terminal to the server.

If the interaction is simple, and can be easily implemented, it is managed at the level of the client terminal by the local rule engine.

Finally, if none of the above options appear to be convenient it is possible to implement some formatted JavaScript short coding elements to be linked to the page to achieve functionalities such as those currently known in the field of HTML pages used for the World Wide Web.

A possible structure for a device according to the invention is more accurately described here after. Device comprises a server part implemented from known computer means including processing means under the form of processors and storing means under the form of memories like RAM (Random Access Memory) and ROM (Read Only Memory). The server part can be remotely made of a single entity or can be a cluster of individual servers connected together through usual transmission means.

Figure 3:
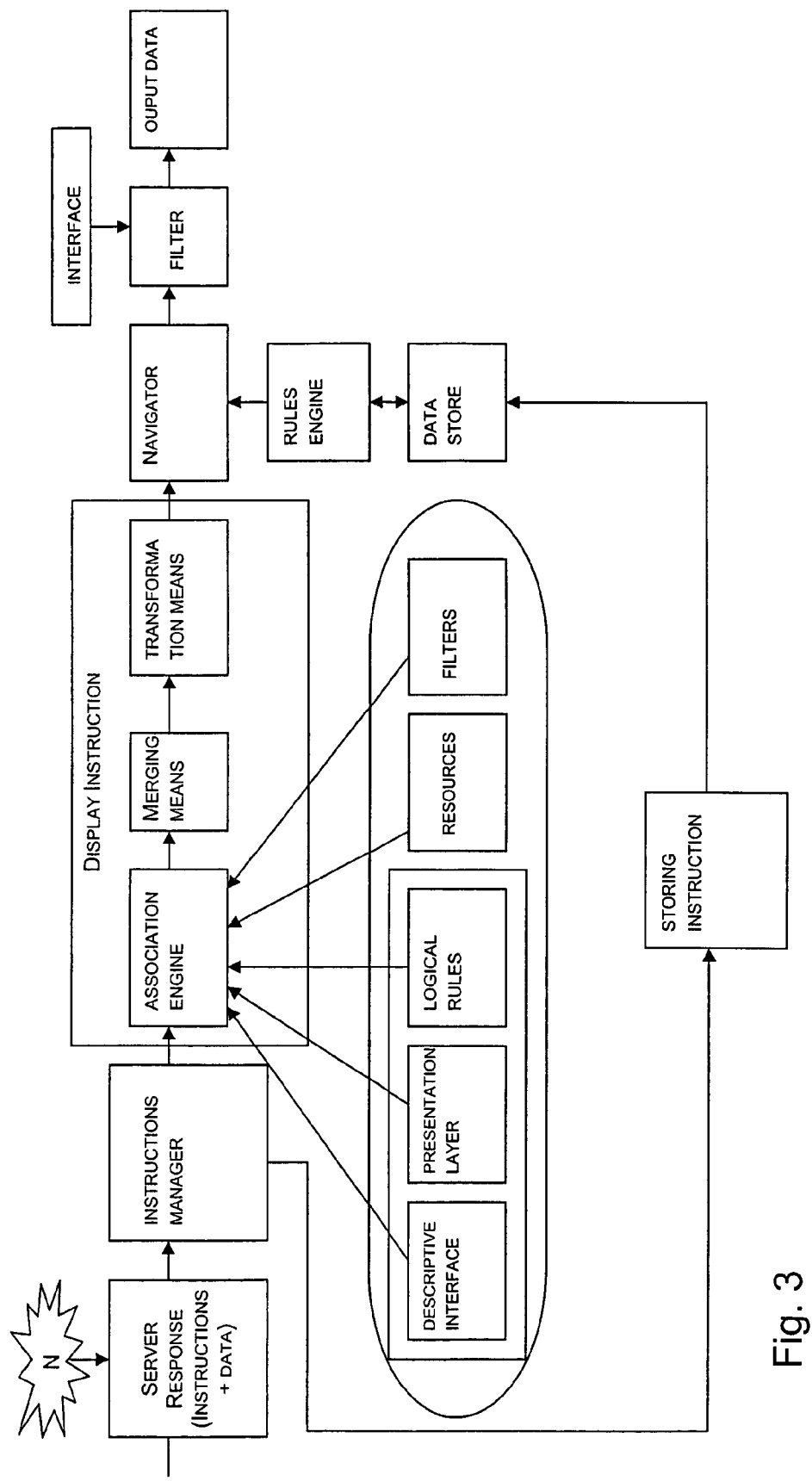
FIG. 3 is a bloc diagram of a device according to the invention and illustrating their interactions.

The device is also comprised of a locally implemented part at the level of the client terminal that can be performed, for example, by a PC (Personal Computer) as shown in FIG. 3.

The server part and the client terminal are connected, for data transmission, through communication means belonging to a network (N) which is, for example, a WAN or Wide Area Network.

In FIG. 3 different device components are depicted along with their interrelations in order to carry out the interfacing method here described.

Through the use of the network N, the server part transmits a response to the request previously issued par the user; response comprises some instruction data and some data to be displayed.

In particular, the XML standard could be used as markup formatted language. The response is received by an instruction manager able to interpret the instruction data contained in the response in order to determine what operations have to be carried out. In the case where a display is to be done, the interpretation includes determining the construction elements to be used for the generation of the visualization model.

The interpretation results are forwarded to an association engine able to extract the static data constituting the construction elements components that characterize the model of visualization previously determined. In FIG. 3 different construction elements used for creating the visualization model are depicted In particular, the visualization model associates an interface aimed at describing its high level components, a presentation layer including the different elements and attributes related to a graphic presentation and some logical rules to be applied to the visualization model while it is processed.

In a preferred embodiment the presentation layer can be made dependent of user profiles however the description interface and the logical rules remain identical. As a consequence, the construction elements can be totally independent data thus can be either stored in separated files or in a same file according to the needs Moreover, other elements are advantageously associated to the visualization models thus created. Especially, language resource data are associated. These data are also chosen among different resources locally available in cache memory at the level of the client terminal. It is then easy to adapt the page to be created to a predetermined language. The indication de language resource to use is also present in the instruction data received in the response.

To the visualization model, one or several filters can also be associated. These filters complement the personalization made possible by the present invention. Indeed, they allow adapting the available information to be displayed to some specific client parameters. It is an especially efficient means to modify the screen visual components in a non-programmatic way such as the user controls (e.g.: deletion of some screen controls, modification regarding the mandatory filling of some input fields . . . ).

Finally, the association of the visualization model to one or more filters, to language resources and to dynamic data received in the response makes possible the formation of a page.

Figure 5:
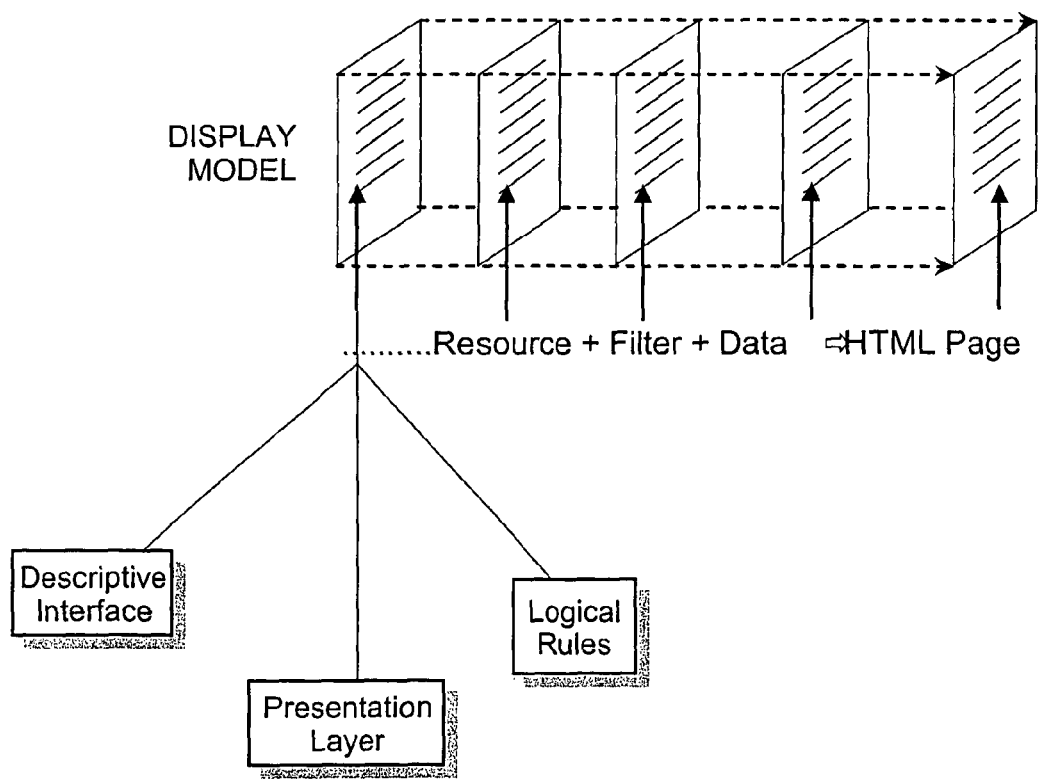
FIG. 5 is an example of component integrated in the visualization means of the client terminal.

This association is more particularly shown in FIG. 5.

Coming back to FIG. 3 it is shown that the merge between the static data thus associated and the dynamic data contained in the response is performed by a merging means. By means of merge it is possible e.g., to create XML formatted data.

The standard navigators and especially, Internet Explorer®, operate with HTML formatted pages. Hence, before transmission to the navigator a transformation into a HTML format is performed with the help of transforming means.

The steps ending up with the display to the user are those currently implemented in existing navigators. However, to allow improved interactions with user, without having to systematically involve the server part, the device according to the invention also comprises a rules engine able to operate from rules contained in a data store. In this way, simple interactions between the navigator and the user can be managed. For example, it is possible to locally determine what data have to be displayed in a drop-down menu according to the client profile and depending on what was the previous input made by the user. This prevents from having to systematically access the server after each client input.

It is also shown in FIG. 3 an opportunity to update or add data in the data store. Indeed, it can be useful to refresh or to supplement the data contained locally in the data store and used by the rules engine. To this end, from the server part, a response is forwarded to the client terminal which contains instruction data and operational data in view of their storing and not for the purpose of being displayed.

When the storing instruction is received it is interpreted. This triggers a storing operation, into the data store, of the data contained in the response.

This step is also shown in FIG. 3.

Also, the client terminal advantageously comprises a cache element serving as a storing means for the locally available data within which a plurality of data can be stored including the different construction elements. These are static data generally used by pages of the HTML type. Any type of memory can be used for such a cache memory especially, a ROM or Read-Only-Memory.

According to a first possibility, the static data are installed from the beginning in the client terminal and are used when requested to be merged with the data issued from the server. Hence, server does not have to transmit the different elements and objects used for the display.

It may also happen that some elements necessary for the display however not initially present must be used.

In this case the present invention allows the creation of the construction elements in the server part and their transmission, once for all, to the client terminal in order to be stored in the cache so that they become re-usable.

Figure 4:
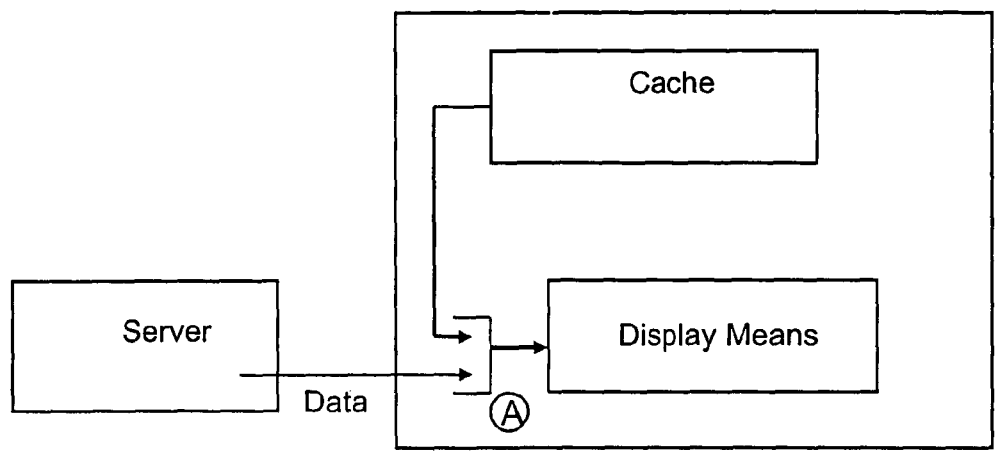
FIG. 4 shows the merging step of the data.

In FIG. 4 the merging step is shown between the data issued from the server and the data coming from the cache after they have been associated.

In this case, it is shown that the merge is performed in the client terminal part after reception of the dynamic data issued from the server within the instructions constituting the server response. The instructions manager, upon reception of the data server, calls the corresponding elements of the visualization model present in the cache. They are associated and merged, for example, to build a page to be transmitted to the display means.

If a necessary construction element is not initially present in the cache, the operation previously described, regarding its transmission from the server part to the client terminal, is first carried out XML formatted data are advantageously processed for the creation of the visualization model and for the data to display. A translation to the HTML format can be performed by the transforming means, after the merge has occurred, in order to obtain a result under the form of a HTML page which can be directly handled by current navigators.

It is worth noting that the objective of the present invention enables a great deal of flexibility in the development of graphic user interfaces while limiting the quantities of transmitted data across networks. Also the client terminal remains a light structure that can be easily set up while the server part keeps playing a chief role in the process of the data and in the management of the visualization elements.

The invention claimed is:

1. Method for graphic interfacing between a user and a computer system in which the following operations are performed:
    inputting a user request at a client terminal,
    transmitting the user request from the client terminal to a server part for processing by the server part,
    receiving a response to the request at the client terminal, the response generated by the server part,
    displaying the response at the client terminal,
    wherein:
    the response comprises instruction data and display data to be displayed;
    at the client terminal, the instruction data are interpreted and forwarded to an association engine;
    at the client terminal, a visualization model is created by the association engine according to the interpreted instruction data through the association of construction elements retrieved from storage at the client terminal, the construction elements including a descriptive interface of visualization model objects, a presentation layer, and logical rules;
    display data of the response are merged, at the client terminal, with the visualization model and displayed as a merged result; and
    the logical rules applied at the client terminal to the visualization model by a rules engine, providing event-operated interface controls in the visualization model and script code to manage the event-operated interface controls at the level of the client terminal.

2. Method according to the claim 1, further comprising the step of:
    at the client terminal, associating a language resource from a plurality of language resources to the visualization model, the plurality of language resources stored at the client terminal, to adapt the visualization model to a predetermined language, a designation of the predetermined language, to be associated to the visualization model, provided in the instruction data from the server part.

3. Method according to claim 1, further comprising the step of:
at the level of the client terminal, associating personalization display filters to the visualization model in order to modify a visual rendering of the visualization model according to specific client parameters.

4. Method according to claim 1, wherein
the instruction data include an indication of a type of construction elements characterizing the visualization model to be created.

5. Method according to claim 1, wherein
data resident at the client terminal are updated at the client terminal through the following steps:
at the server part, generating a storing message which includes storing instruction data and data to be stored,
transmitting the storing message from the server part to the client terminal,
at the client terminal, storing the data to be stored in a memory device local to the client terminal in a manner according to the storing instruction data.

6. Method according to claim 1, wherein
display is performed at the client terminal through the use of a navigator.

7. Method according to claim 1, wherein,
at least a portion of the data to be displayed and at least a portion of the construction elements use a XML format, and
the merged result is translated to HTML format in order to be displayed.

8. Method according to the claim 1, wherein the script code is provided in the Javascript scripting language.

9. Method according to the claim 1, wherein the visualization model comprises images, script code, and markups, the script code being in the Javascript scripting language, the markups being in Hypertext Markup Language (HTML).

10. Graphic interface device between a user and a computer system, comprising:
means for inputting a user request at the client terminal;
means for communicating between the client terminal and a server part; and
processing means for generating a response from the server part to be transmitted to the client terminal; and
means for displaying the response at the client terminal, wherein,
the response from the server part comprises instruction data and display data to be displayed,
said graphic interface device further comprising: an instructions manager at the client terminal to interpret the instruction data received from the server part,
said graphic interface device further comprising: an association engine at the client terminal able to create a visualization model through the association of construction elements based on the instruction data interpreted by the instructions manager, the construction elements retrieved from storage at the client terminal and including a descriptive interface of visualization model objects, a presentation layer, and logical rules, the logical rules to be applied at the client terminal to the visualization model;
said graphic interface device further comprising: storing means at the client terminal for storing the construction elements at the client terminal;
said graphic interface device further comprising: means for merging the visualization model with the display data of the response, a result of the merging to be displayed at the client terminal; and
said graphic interface device further comprising: a rules engine, at the client terminal, configured to provide event-operated interface controls in the visualization model, and script code to manage the event-operated interface controls at the level of the client terminal.

11. Device according to claim 10, further comprising:
at the client terminal, a navigator to display the merging result.

12. Device according to claim 10, wherein the script code is provided in the Javascript scripting language.

13. Device according to claim 10, wherein the visualization model comprises images, script code, and markups, the script code being in the Javascript scripting language, the markups being in Hypertext Markup Language (HTML).

14. Device according to claim 10, further comprising:
a plurality of language resources stored at the client terminal, the instruction data providing a designation of one of the plurality of language resources to be associated with the visualization model, the association model adapting the visualization model to the designated language resource.

15. Device according to claim 10, further comprising:
personalization display filters configured to modify a visual rendering of the visualization model according to specific client parameters.

16. A graphic interface device between a user and computer system, comprising:
a client terminal including an input device, a storage device, and a graphical display device to interact with a user, the client terminal in communication with the server part by a communication means, wherein,
the client terminal includes
i) an instructions manager configured to receive a response from a computer server part, the response generated as a result of a user request transmitted from the client terminal to the server part, the response including instruction data and display data,
ii) an association engine configured to create a visualization model from a plurality of construction elements, the construction elements retrieved from the storage device, based on the instruction data interpreted by the instructions manager, the construction elements including static model graphic objects, a presentation layer including different elements and attributes related to a graphic presentation, and logical rules,
iii) a storage engine configured to store the construction element at the client terminal,
iv) a merging means configured to merge the visualization model with the display data of the response as a merged result,
v) a rules engine configured to provide event-driven interface controls to the visualization model, and Javascript code to manage the event-operated interface controls, based on the logical rules, and
vi) a transformation engine configured to transform the merged result into display elements for display on a navigator operating on the graphical display device.

* * * * *